(12) United States Patent
Ratner et al.

(10) Patent No.: US 9,010,691 B1
(45) Date of Patent: Apr. 21, 2015

(54) PARACHUTE DEPLOYMENT SYSTEM

(71) Applicant: Google Inc., Mountain View, CA (US)

(72) Inventors: Daniel Ratner, Mountain View, CA (US); Phillip Clarin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/071,713

(22) Filed: Nov. 5, 2013

(51) Int. Cl.
*B64D 17/52* (2006.01)
*B64D 17/64* (2006.01)
*B64B 1/40* (2006.01)
*B64D 17/70* (2006.01)
*B64D 17/72* (2006.01)

(52) U.S. Cl.
CPC . *B64D 17/64* (2013.01); *B64B 1/40* (2013.01); *B64D 17/70* (2013.01); *B64D 17/725* (2013.01)

(58) Field of Classification Search
USPC ............. 244/149, 31, 147, 142, 144; 455/431
See application file for complete search history.

(56) References Cited

U.S. PATENT DOCUMENTS

| | | | | | |
|---|---|---|---|---|---|
| 2,151,336 | A | * | 3/1939 | Scharlau | 342/385 |
| 2,444,642 | A | * | 7/1948 | Frieder et al. | 244/32 |
| 2,793,824 | A | * | 5/1957 | D'ooge | 244/32 |
| 3,471,856 | A | * | 10/1969 | Hollenbaugh et al. | 342/50 |
| 3,614,031 | A | * | 10/1971 | Demboski | 244/32 |
| 3,781,893 | A | * | 12/1973 | Beukers et al. | 343/702 |
| 6,199,800 | B1 | * | 3/2001 | Coe | 244/142 |
| 6,628,941 | B2 | * | 9/2003 | Knoblach et al. | 455/431 |
| 7,530,527 | B2 | | 5/2009 | Kelleher | |
| 7,801,522 | B2 | | 9/2010 | Knoblach et al. | |
| 7,844,218 | B2 | | 11/2010 | Seligsohn et al. | |
| 8,061,647 | B1 | | 11/2011 | Powell | |
| 8,403,268 | B2 | * | 3/2013 | Suze et al. | 244/149 |
| 8,483,120 | B2 | * | 7/2013 | Seligsohn et al. | 370/316 |
| 2003/0040273 | A1 | * | 2/2003 | Seligsohn et al. | 455/12.1 |
| 2014/0014770 | A1 | * | 1/2014 | Teller et al. | 244/97 |

* cited by examiner

*Primary Examiner* — Christopher P Ellis
(74) *Attorney, Agent, or Firm* — McDonnell Boehnen Hulbert & Berghoff LLP

(57) ABSTRACT

The present disclosure provides a parachute deployment system. The system may include a deployment spring arranged on a launch platform with a parachute that is foldable and positionable on an opposite side of the deployment spring from the launch platform. The system may also include a bridle line attached to the parachute, and a lanyard line having a first end and a second end. The first end of the lanyard line may be attached to the deployment spring, and the second end of the lanyard line may be attached to the launch platform. The system may also include a trigger system configured to initiate deployment of the parachute. Upon deployment, the deployment spring may be configured to launch the parachute and the bridle line substantially perpendicular to the launch platform. After deployment, the deployment spring and the lanyard line may be configured to hang from the launch platform.

20 Claims, 10 Drawing Sheets

PARACHUTE DEPLOYMENT SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

An example balloon may also include a parachute deployment system configured to deploy a parachute to help the balloon descend safely to the ground. The parachute deployment system may include a deployment spring arranged on a launch platform. The launch platform may be connected to the balloon at the top of the envelope, at the payload, or at some other location. The launch platform may include an angled portion on which the deployment spring sits to encourage a parabolic trajectory of the deployed parachute. The parachute may be packed tightly to ensure it achieves maximum distance when deployment occurs. The further the parachute is launched away from the launch platform, the more likely the parachute will avoid tangling with other components of the parachute deployment system. The parachute may be connected to a bridle line, which may in turn be connected to the launch platform or a second parachute. The folded parachute and bridle line may be placed on top of the deployment spring. A lanyard line may be tied to the bottom of the deployment spring, and the other end of the lanyard line may be tied to the launch platform. Further, a trigger system may be configured to initiate deployment of the parachute.

At deployment, the deployment spring launches the parachute and the bridle line away from the launch platform. The deployment spring also travels away from the launch platform until it reaches the end of the lanyard line. At that time, the lanyard line redirects the forward momentum of the deployment spring towards the side of the launch platform. By moving the deployment spring out of the path of the bridle line, tangling between those two components may be eliminated, thereby ensuring a proper deployment of the parachute.

In one aspect, the present disclosure provides a system. The system may include a deployment spring arranged on a launch platform. The system may also include a parachute that is foldable and positionable on an opposite side of the deployment spring from the launch platform. The system may also include a bridle line having a first end and a second end, and the first end of the bridle line may be attached to the parachute. The system may also include a lanyard line having a first end and a second end. The first end of the lanyard line may be attached to the deployment spring, and the second end of the lanyard line may be attached to the launch platform. The system may also include a trigger system configured to initiate deployment of the parachute. Upon deployment, the deployment spring may be configured to launch the parachute and the bridle line substantially perpendicular to the launch platform. After deployment, the deployment spring and the lanyard line may be configured to hang from the launch platform.

In another aspect, the present disclosure provides a method. The method may include receiving an indication that a balloon should deploy a parachute. The method may also include, in response to the received indication, activating a parachute deployment system on the balloon. The parachute deployment system may include a deployment spring arranged on a launch platform. The parachute deployment system may also include a parachute folded and arranged on an opposite side of the deployment spring from the launch platform. The parachute deployment system may also include a bridle line having a first end and a second end, and the first end of the bridle line may be attached to the parachute. The parachute deployment system may also include a lanyard line having a first end and a second end. The first end of the lanyard line may be attached to the deployment spring, and the second end of the lanyard line may be attached to the launch platform. The parachute deployment system may also include a trigger system configured to initiate deployment of the parachute. Upon deployment, the deployment spring may be configured to launch the parachute and the bridle line substantially perpendicular to the launch platform. After deployment, the deployment spring and the lanyard line may be configured to hang from the launch platform.

In yet another aspect, the present disclosure provides a balloon. The balloon may include a payload, an envelope, and a parachute deployment system. The parachute deployment system may include a deployment spring arranged on a launch platform. The parachute deployment system may also include a parachute that is foldable and positionable on an opposite side of the deployment spring from the launch platform. The parachute deployment system may also include a bridle line having a first end and a second end, and the first end of the bridle line may be attached to the parachute. The parachute deployment system may also include a lanyard line having a first end and a second end. The first end of the lanyard line may be attached to the deployment spring, and the second end of the lanyard line may be attached to the launch platform. The parachute deployment system may also include a trigger system configured to initiate deployment of the parachute. Upon deployment, the deployment spring may be configured to launch the parachute and the bridle line substantially perpendicular to the launch platform. After deployment, the deployment spring and the lanyard line may be configured to hang from the launch platform.

These as well as other aspects, advantages, and alternatives, will become apparent to those of ordinary skill in the art by reading the following detailed description, with reference where appropriate to the accompanying drawings.

DETAILED DESCRIPTION

Figure 1:
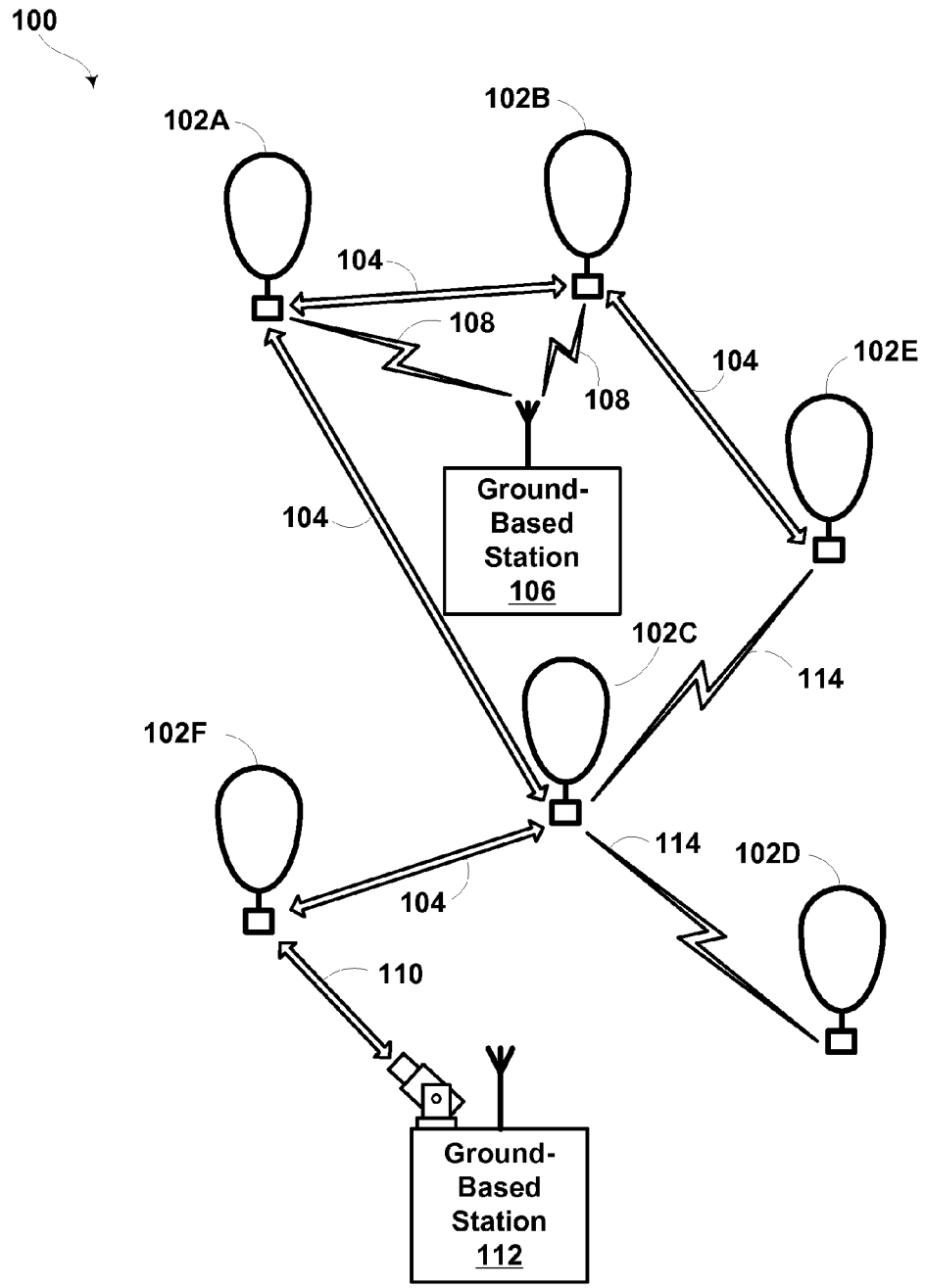
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Example embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations. Note, however, that example embodiments may also relate to a balloon generally, such as to a high-altitude balloon.

Various types of balloon systems may be incorporated in an exemplary balloon network. An exemplary embodiment may utilize high-altitude balloons, which typically operate in an altitude range between 18 km and 25 kilometers. In an exemplary embodiment, such high-altitude balloons may include an envelope, and a payload, along with various other components. Of course, embodiments described herein may also relate to or be implemented in conjunction with other types of balloons as well.

An example balloon may also include a parachute system that helps the balloon descend safely to the ground. In some cases, the parachute system may deploy when an unexpected event causes the balloon to descend (e.g., the envelope tearing). A balloon may also be intentionally brought down to the ground for various reasons, such as when it is time to remove the balloon from a balloon network, when maintenance is due on systems within the payload, and/or when the power supply needs to be recharged or replaced. A balloon may also be intentionally brought down to the ground in other situations, such as when the balloon encounters severe weather and must quickly descend to avoid serious damage to the balloon, or when the balloon's envelope bursts or leaks, as examples.

In some examples, a deployment spring is used to deploy the parachute. The deployment spring may be kept at a compressed state until deployment of the parachute is necessitated. The parachute may be packed and placed on the deployment spring. At deployment, the deployment spring is configured to rapidly return to its relaxed state, thereby launching the packed parachute away from the deployment spring. The packed parachute is configured to open once launched from the deployment spring, and a bridle line may be used to connect the parachute to the balloon.

In some existing parachute systems, a deployment spring may be connected to the parachute, or fixed to a launch platform on the balloon. However, in these arrangements, the deployment spring can interfere with the bridle line once the parachute is deployed, which can lead to tangling of the bridle line with the deployment spring.

As such, example embodiments may provide a parachute deployment system that helps to avoid the tangling issues of other parachute systems. In an example embodiment, a parachute deployment system may include a deployment spring arranged on a launch platform. The launch platform may be connected to the balloon at the top of the envelope, at the payload, or at some other location. The launch platform may include an angled portion on which the deployment spring sits to encourage a parabolic trajectory of the deployed parachute. The parachute may be packed tightly to ensure it achieves maximum distance when deployment occurs. The further the parachute is launched away from the launch platform, the more likely the parachute will avoid tangling with other components of the parachute deployment system. The parachute may be connected to a bridle line, which may in turn be connected to the launch platform or a second parachute. The folded parachute and bridle line may be placed on top of the deployment spring. A lanyard line may be tied to the bottom of the deployment spring, and the other end of the lanyard line may be tied to the launch platform.

The deployment system may receive an indication that a parachute should be deployed. In one embodiment, the indication that the balloon should deploy a parachute may be responsive to information from one or more sensors located on the payload of the balloon. For example, if the balloon is rapidly accelerating downward, an accelerometer located on the payload may send an indication to the balloon that the parachute should be deployed. In another example, a computer system on the payload may indicate when maintenance is due on systems within the payload, and/or when the power supply needs to be recharged or replaced, and responsively indicate that the balloon should deploy its parachute. In another embodiment, the indication that the balloon should deploy its parachute may be responsive to information from a ground-based station. For example, a ground-based station may detect inclement weather in the location of the balloon, and may indicate that the balloon should deploy its parachute to escape the weather. Other scenarios in which a balloon would deploy its parachute are possible as well.

Responsive to the indication that the parachute deployment system should deploy the parachute, a trigger system may be configured to initiate deployment of the parachute. At deployment, the deployment spring launches the parachute and the bridle line away from the launch platform. The deployment spring also travels away from the launch platform until it reaches the end of the lanyard line. At that time, the lanyard line redirects the forward momentum of the deployment spring towards the side of the launch platform. By moving the deployment spring out of the path of the bridle line, tangling between those two components may be eliminated, thereby ensuring a proper deployment of the parachute.

It should be understood that the above examples are provided for illustrative purposes, and should not be construed as limiting. As such, the method additionally or alternatively includes other steps or includes fewer steps, without departing from the scope of the invention.

II. Example Balloon Networks

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area.

Further, in some embodiments, some or all balloons may be continually moving while at the same time maintaining desired coverage over the ground (e.g., as balloons move out of an area, other balloons move in to take their place). In such an embodiment, a station-keeping process may in fact take the form of fleet-planning process that plans and coordinates the movement of the balloons. Other examples of station-keeping are also possible.

B. Control of Balloons in a Balloon Network

Figure 2:
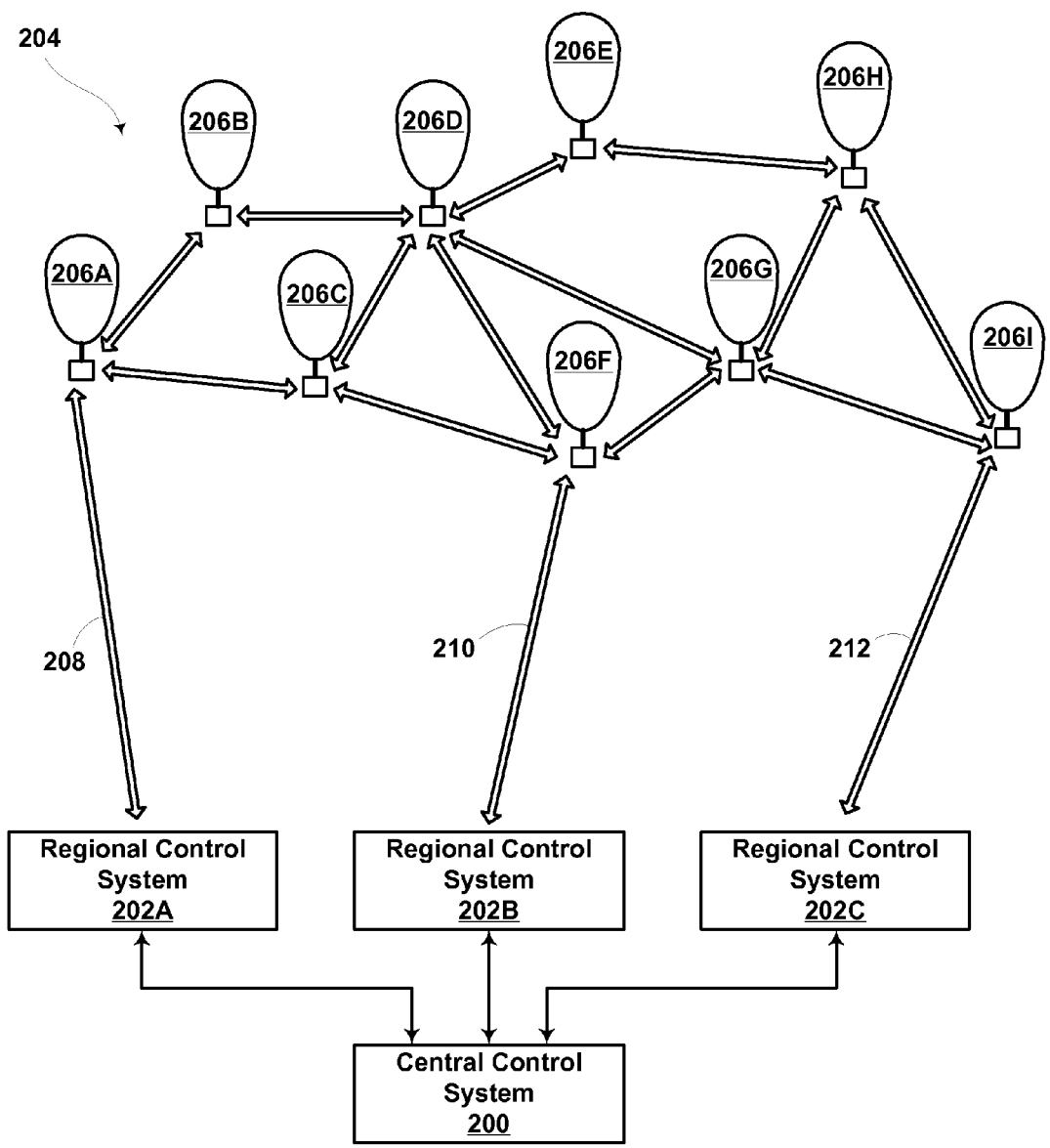
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

Further, control systems such as those described above may determine when and/or where individual balloons should be taken down. Additionally, the control systems may navigate the balloons to locations where they are to be taken down. The control systems may also cause the balloons to be taken down, and may control their descent and/or otherwise facilitate their descent.

III. Exemplary Balloon Configuration

Figure 3:
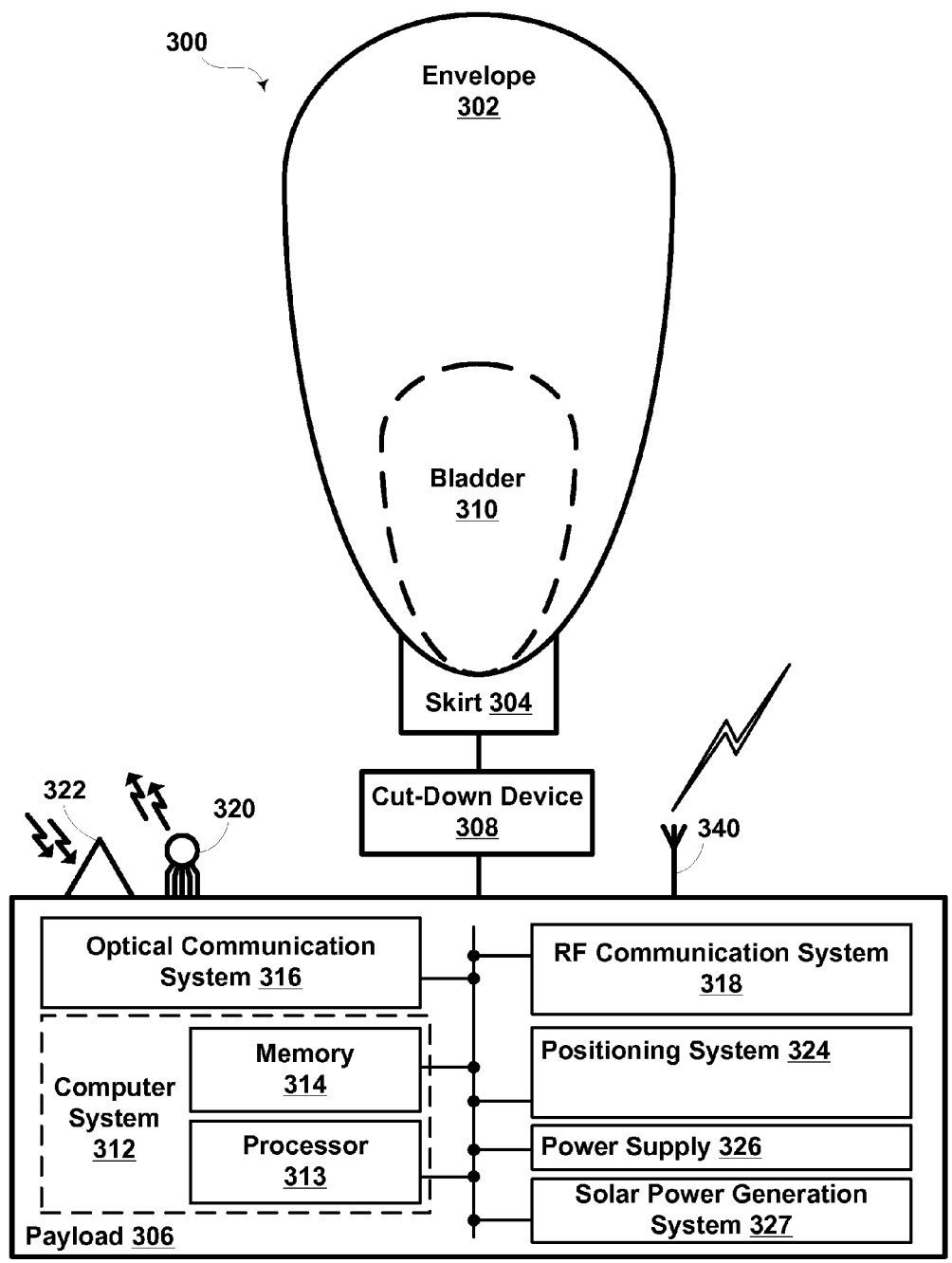
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down device 308, which is attached between the balloon 302 and payload 306.

The envelope 302 and skirt 304 may take various forms, which may be currently well-known or yet to be developed.

For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a computer system 312, which may include a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down device 308. The cut-down device 308 may be activated to separate the payload 306 from the rest of balloon 300. The cut-down device 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced. Note that in an example embodiment, the cut-down device 308 may be used in conjunction with a parachute system. However, it should be understood that a cut-down device 308 is optional.

In an alternative arrangement, a balloon may not include a cut-down device. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft. In yet another embodiment, the balloon may include a parachute system configured to enable the balloon 300 and payload 306 to descend safely to the ground.

IV. Example Parachute Deployment System

As discussed above, each balloon in the balloon network may include a parachute system configured to help the balloon to descend safely to the ground. In some examples, a deployment spring is used to deploy the parachute. The deployment spring may be kept at a compressed state until deployment of the parachute is necessitated. The parachute may be packed and placed on the deployment spring. At deployment, the deployment spring is configured to rapidly return to its relaxed state, thereby launching the packed parachute away from the deployment spring. The packed parachute is configured to open once launched from the deployment spring, and a bridle line may be used to connect the parachute to the balloon.

Traditionally, the deployment spring may be connected to the parachute, or fixed to a launch platform on the top of the envelope. However, these arrangements lead to tangling of the bridle line with the deployment spring because the deployment spring interferes with the trajectory of the bridle line once the parachute is launched by the deployment spring. Therefore, an improved system and method of deploying the parachute may be desirable.

Figure 4A:
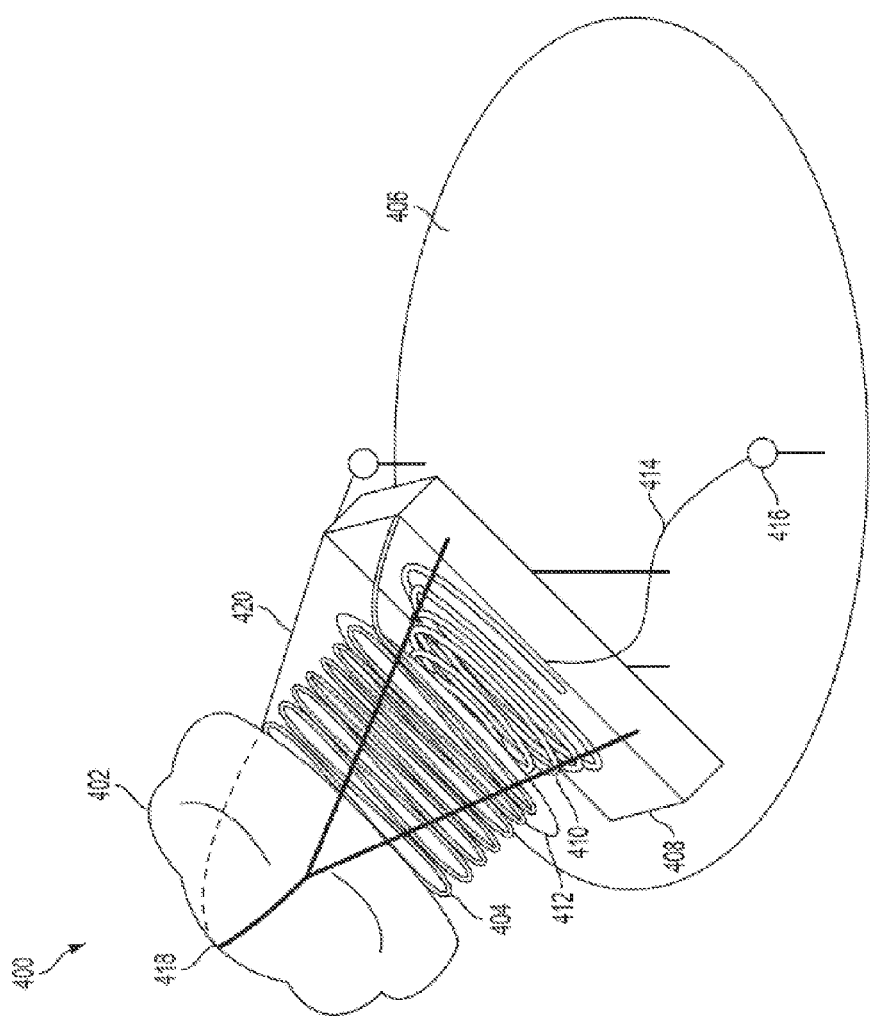
FIG. 4A illustrates an example parachute deployment system prior to deployment of the parachute.

FIG. 4A illustrates an example parachute deployment system 400 prior to deployment of a parachute 402. The parachute 402 is attached to one end of a bridle line 404, and the other end of the bridle line 404 may be attached to a launch platform 406. The bridle line 404 may include nylon, polyester, or some other material. The bridle line 404 may be folded in a figure eight fashion to prevent the bridle line 404 from tangling when deployment occurs. Further, the folded bridle line 404 may be tucked into a fold of the tightly packed parachute 402 to ensure both the bridle line 404 and the parachute 402 achieve maximum distance from the launch platform 406 when deployment occurs. The further the parachute 402 and the bridle line 404 are launched away from the launch platform 406, the more likely the parachute 402 and bridle line 404 will avoid tangling with other components of the parachute deployment system 400.

The launch platform 406 may include an angled portion 408 on which the deployment spring 410 may be compressed prior to deployment. The angled portion 408 of the launch platform 406 may encourage a parabolic trajectory of the deployed parachute 402. The launch platform 406 may be connected to a balloon at the top of the envelope, at the payload, or at some other location.

The folded parachute 402 and bridle line 404 are arranged on the opposite side of the deployment spring 410 from the launch platform 406. In one embodiment, the deployment spring 410 may include a pad 412 on which the folded parachute 402 may be placed. The parachute deployment system 400 may also include a lanyard line 414, which may be attached to the deployment spring 410. The other end of the lanyard line 414 may be attached to the launch platform 406. The lanyard line 414 is configured to have slack prior to deployment of the parachute 402. As a specific example, the lanyard line 414 may be tied to an eyelet 416 that is connected to the launch platform 406. Other examples are possible as well.

The parachute deployment system 400 may also include a trigger system configured to initiate deployment of the parachute 402. In one example, the deployment spring 410 may be held in a compressed position by a strap 418. One end of the strap 418 may be y-shaped as shown in FIG. 4A, and the strap 418 may be attached to the angled portion 408 of the launch platform 406. The other end of the strap 418 may be connected to a trigger line 420. The trigger line 420 may be tied to the launch platform 406 until deployment. The trigger system may also include a release mechanism (not shown) that is configured to cut the trigger line 420 to initiate deployment of the parachute 402. The release mechanism may be a squib, an explosive bolt, or a shearing mechanism, as examples. In another example, the release mechanism may include a nichrome wire wrapped around the trigger line 420. The nichrome wire may be configured to receive a current and generate heat, thereby melting the trigger line 420. Other release mechanisms are possible as well.

In another example, the deployment spring 410 may be held in a compressed position by a latch (not shown). In such an example, the trigger system may include a solenoid configured to release the latch to initiate deployment of the parachute 402. In yet another example, two trigger lines may be used to hold down the deployment spring 410 in a compressed position prior to deployment. In such an example, the trigger system may include two release mechanisms that are configured to cut the two trigger lines simultaneously. Other embodiments are possible as well.

Figure 4B:
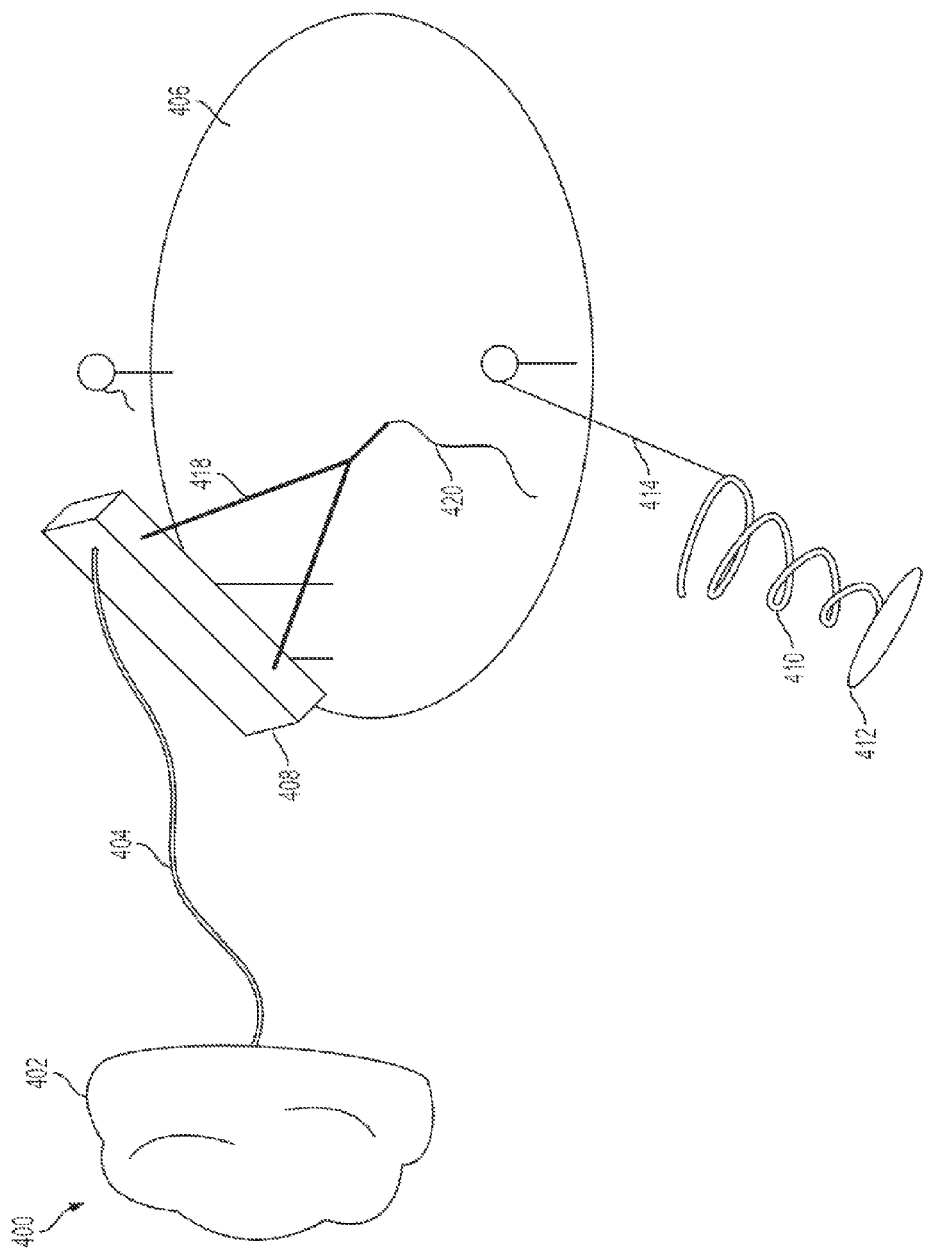
FIG. 4B illustrates an example parachute deployment system during deployment of the parachute.

FIG. 4B illustrates an example parachute deployment system 400 during deployment of the parachute 402. Once the trigger system has initiated deployment of the parachute 402, the deployment spring 410 launches the parachute 402 and the bridle line 404 substantially perpendicular to the angled portion 408 of the launch platform 406. The deployment spring 410 also travels away from the launch platform 406 until it reaches the end of the lanyard line 414. At that time, the lanyard line 414 redirects the forward momentum of the deployment spring 410 towards the side of the launch platform 406. By redirecting the deployment spring 410 out of the path of the bridle line 404, tangling between those two components may be significantly reduced, thereby allowing a proper deployment of the parachute 402.

Figure 4C:
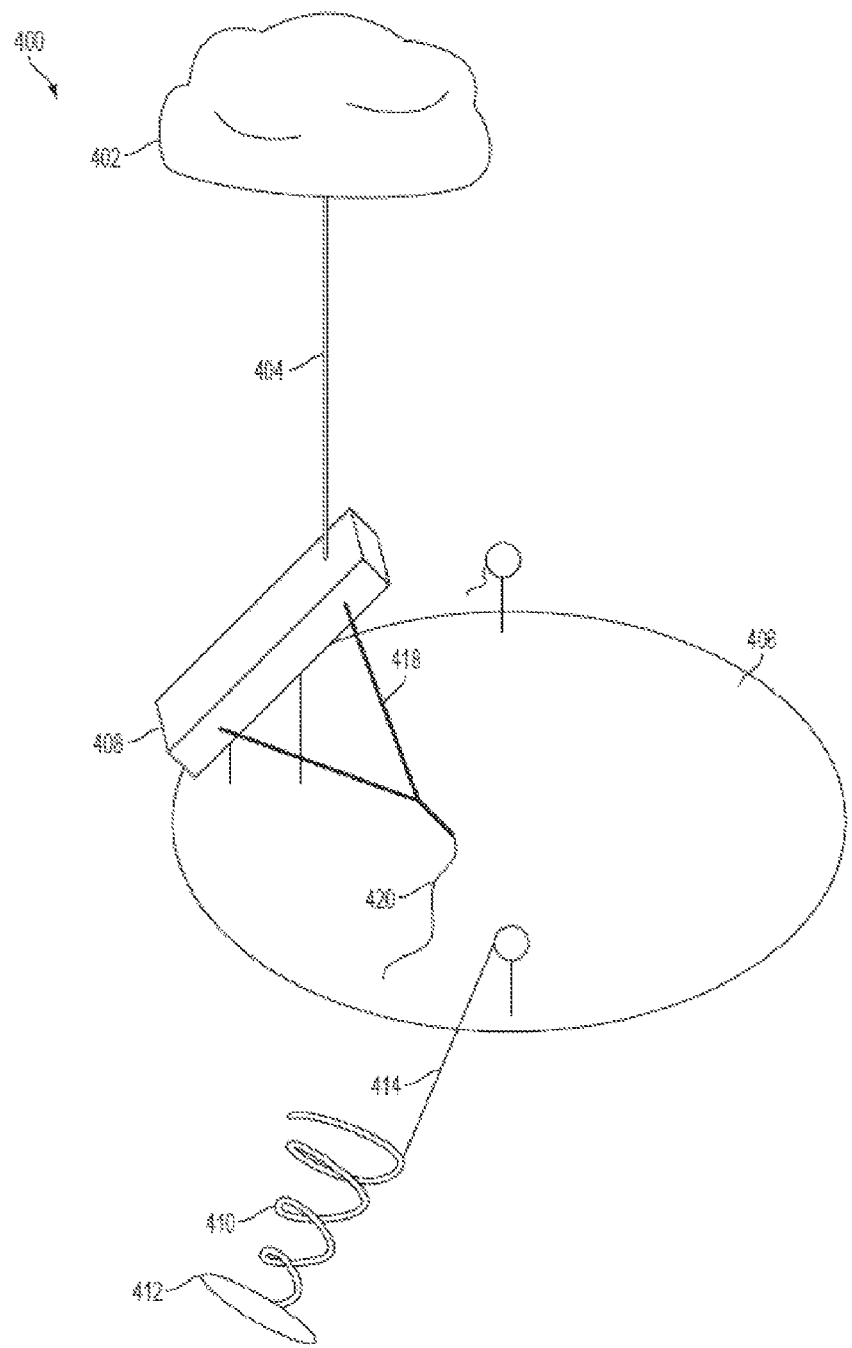
FIG. 4C illustrates an example parachute deployment system after deployment of the parachute.

FIG. 4C illustrates an example parachute deployment system 400 after deployment of the parachute 402. After deployment, the bridle line 404 is substantially perpendicular to the ground, and the parachute 402 is fully opened. Further, the deployment spring 410 and the lanyard line 414 are configured to hang from the side of the launch platform 406. In FIG. 4C, the bridle line 404 is shown attached to the angled portion 408 of the launch platform 406. In another example, the bridle line 404 may be attached to a different part of the launch platform 406. Upon opening, the parachute 402 may create additional drag force, thereby slowing the descent of the balloon towards the earth.

Figure 4D:
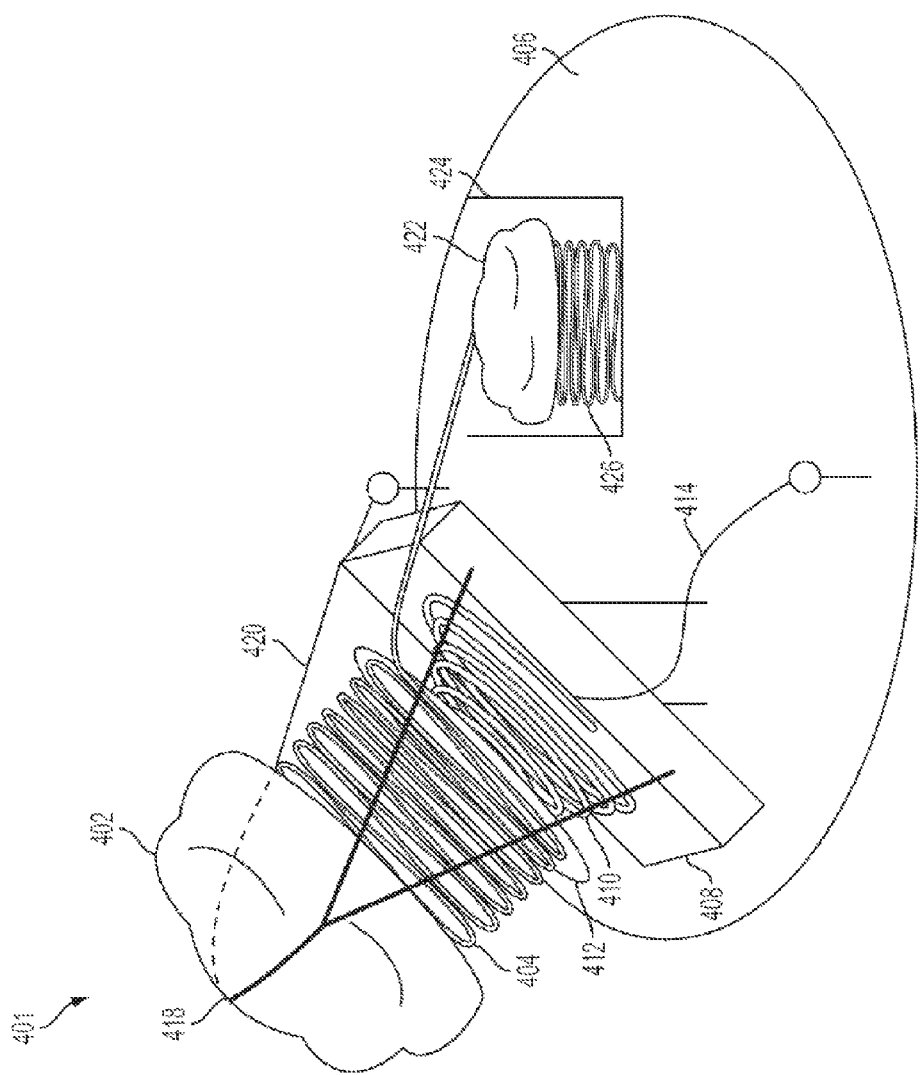
FIG. 4D illustrates another example parachute deployment system prior to deployment.

FIG. 4D illustrates another example parachute deployment system 401 prior to deployment. Parachute system 401 is similar to the parachute deployment system 400 described in relation to FIGS. 4A-4C. However, the parachute 402 in parachute deployment system 401 is a drogue parachute used to deploy a main parachute 422. One end of the bridle line 404 is attached to drogue parachute 402, and the other end of the bridle line 404 is attached to the main parachute 422. In some embodiments, the main parachute 422 is bigger in size than the drogue parachute 402. The main parachute 422 is folded and stored in a container 424 mounted to the launch platform 406. The main parachute 422 is attached to a second bridle line 426, which is in turn attached to the launch platform 406.

Figure 4E:
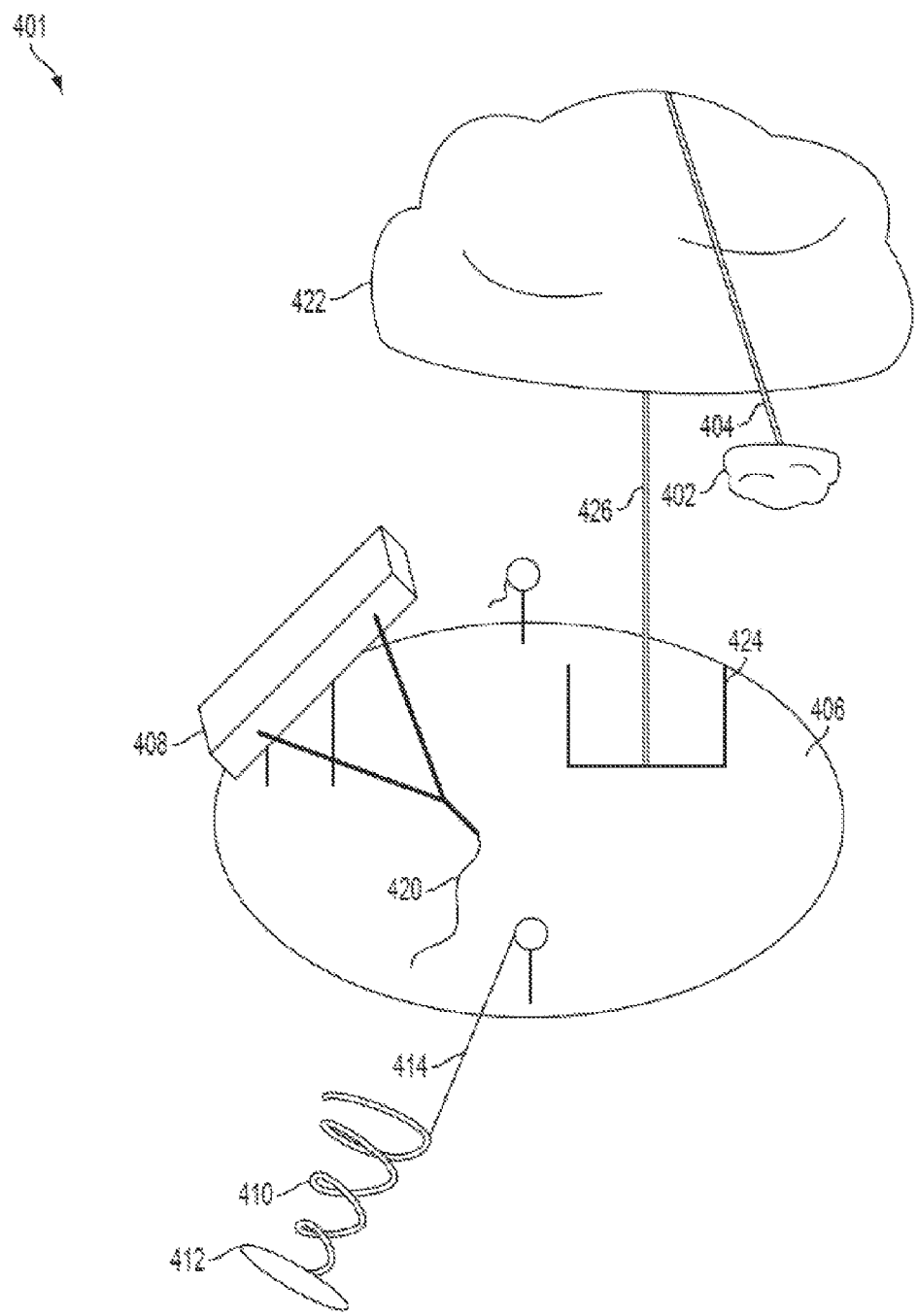
FIG. 4E illustrates another example parachute deployment system after deployment.

FIG. 4E illustrates example parachute deployment system 401 after deployment. Once the trigger system has initiated deployment of the drogue parachute 402, the deployment spring 410 launches the drogue parachute 402 and the bridle line 404 substantially perpendicular to the angled portion 408 launch platform 406. The deployment spring 410 also travels away from the launch platform 406 until it reaches the end of the lanyard line 414. At that time, the lanyard line 414 redirects the forward momentum of the deployment spring 410 towards the side of the launch platform 406, thereby preventing tangling between the deployment spring 410 and the bridle line 404.

As the drogue parachute 402 opens, it catches the air and inflates. The inflated drogue parachute 402 then pulls out the main parachute 422 from the container 424 fixed to the launch platform 406. Once the main parachute 422 is fully opened, the drogue parachute 402 may hang from the side of the main parachute 422 and the second bridle line 426 is substantially perpendicular to the ground. Further, the deployment spring 410 and the lanyard line 414 are configured to hang from the side of the launch platform 406. Upon opening, the main parachute 422 may create additional drag force, thereby slowing the descent of the balloon towards the earth.

Figure 5B:
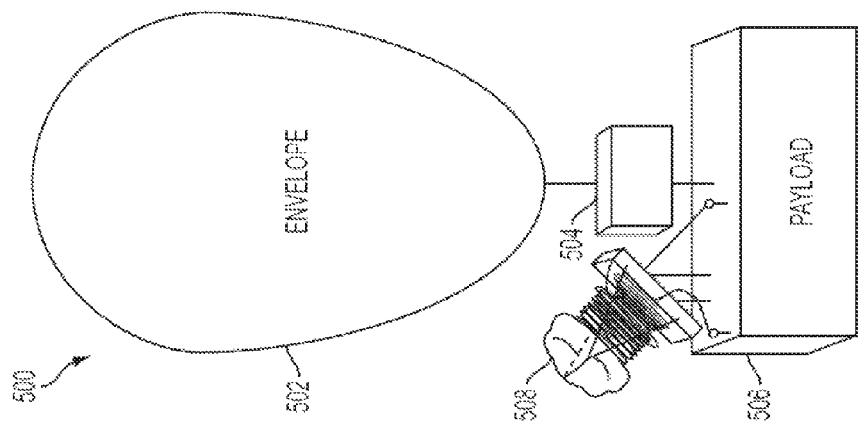
FIG. 5B illustrates another high-altitude balloon, according to an example embodiment.
Figure 5A:
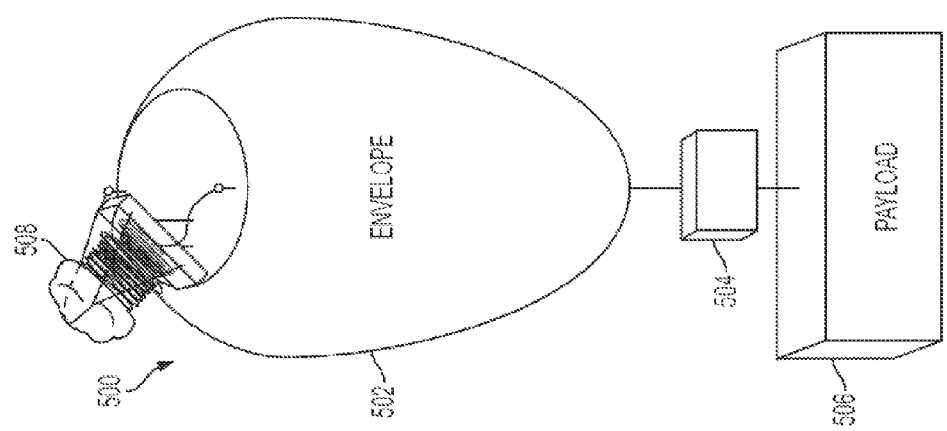
FIG. 5A illustrates a high-altitude balloon, according to an example embodiment.

FIG. 5A illustrates a high-altitude balloon 500, according to an example embodiment. The balloon 500 includes an envelope 502, a cut-down device 504, and a payload 506. The balloon 500 may include a parachute deployment system 508 at the top of the envelope 502. The parachute deployment system 508 may include the features described above in FIGS. 4A-4E. FIG. 5B illustrates another high-altitude balloon 500, according to an example embodiment. Similar to the balloon in FIG. 5A, balloon 500 may include an envelope 502, a cut-down device 504, and a payload 506. The balloon may include a parachute deployment system 508 that is mounted to the payload 506 of the balloon. In such an embodiment, the parachute deployment system 508 may be activated when the cut-down device 504 separates the payload 506 from the rest of balloon 500. Other embodiments are possible as well.

V. Examples of Methods

Figure 6:
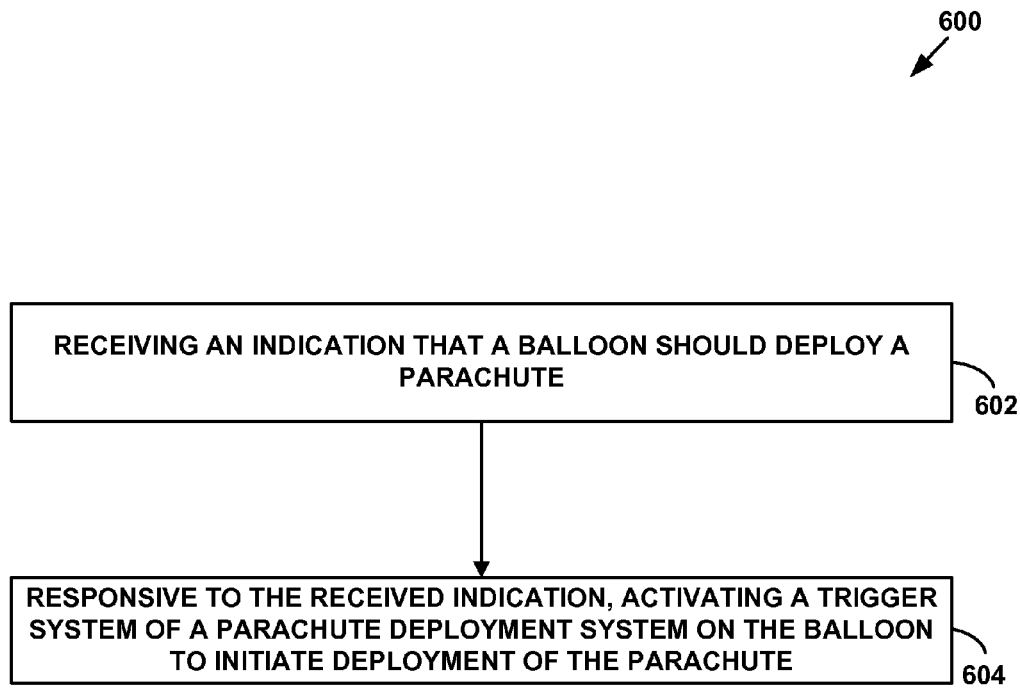
FIG. 6 is depicts a flow chart, according to an example embodiment.

FIG. 6 is a simplified flow chart illustrating method 700, according to an exemplary embodiment. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 602, method 600 involves receiving an indication that a balloon should deploy a parachute. In one embodiment, the indication that the balloon should deploy a parachute may be responsive to information from one or more sensors located on the payload of the balloon. For example, if the balloon is rapidly accelerating downward, an accelerometer located on the payload may send an indication to the balloon that the parachute should be deployed. In another example, a computer system on the payload may indicate when maintenance is due on systems within the payload, and/or when the power supply needs to be recharged or replaced, and responsively indicate that the balloon should deploy its parachute. In another embodiment, the indication that the balloon should deploy its parachute may be responsive to information from a ground-based station. For example, a ground-based station may detect inclement weather in the location of the balloon, and may indicate that the balloon should deploy its parachute to escape the weather. Other examples are possible as well.

At block 604, method 600 involves, in response to the received indication, activating a parachute deployment system on the balloon. As described above, the parachute deployment system may include a deployment spring arranged on a launch platform. The launch platform may be connected to the balloon at the top of the envelope, at the payload, or at some other location. The parachute may be connected to a bridle line, which may in turn be connected to the launch platform or a second parachute. The folded parachute and bridle line may be placed on top of the deployment spring. A lanyard line may be tied to the bottom of the deployment spring, and the other end of the lanyard line may be tied to the launch platform.

In response to the received indication that the parachute deployment system should deploy the parachute, a trigger system may be activated to initiate deployment of the parachute. As described above, the trigger system may include a trigger line that may be cut at deployment, a latch that may be released at deployment, or some other trigger mechanism configured to release the compressed deployment spring. At deployment, the deployment spring launches the parachute and the bridle line away from the launch platform. The deployment spring also travels away from the launch platform until it reaches the end of the lanyard line. At that time, the lanyard line redirects the forward momentum of the deployment spring towards the side of the launch platform. By moving the deployment spring out of the path of the bridle line, tangling between those two components may be eliminated, thereby ensuring a proper deployment of the parachute.

VI. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
a deployment spring arranged on a launch platform;
a parachute that is foldable and positionable on an opposite side of the deployment spring from the launch platform;
a bridle line having a first end and a second end, wherein the first end of the bridle line is attached to the parachute;
a lanyard line having a first end and a second end, wherein the first end of the lanyard line is attached to the deployment spring, and wherein the second end of the lanyard line is attached to the launch platform; and
a trigger system configured to initiate deployment of the parachute, wherein upon deployment the deployment spring is configured to launch the parachute and the bridle line substantially perpendicular to the launch platform, and wherein after deployment the deployment spring and the lanyard line are configured to hang from the launch platform.

2. The system of claim 1, wherein the second end of the bridle line is attached to the launch platform.

3. The system of claim 1, wherein the parachute is configured to operate as a drogue parachute to deploy a second parachute, and wherein the second end of the bridle line is attached to the second parachute.

4. The system of claim 3, wherein the drogue parachute is smaller in size than the second parachute.

5. The system of claim 3, further comprising:
a container coupled to the launch platform, wherein the second parachute is stored in the container; and
a second bridle line having a first end and a second end, wherein the first end of the second bridle line is attached to the second parachute, and wherein the second end of the second bridle line is attached to the launch platform.

6. The system of claim 1, wherein the trigger system includes:
a trigger line having a first end and a second end, wherein the first end of the trigger line is attached to a strap configured to hold the deployment spring in a compressed state, and wherein the second end of the trigger line is attached to the launch platform; and
a release mechanism configured to cut the trigger line.

7. The system of claim 6, wherein the release mechanism includes one or more of a squib, an explosive bolt, and a shearing mechanism.

8. The system of claim 6, wherein the release mechanism includes a nichrome wire wrapped around the trigger line, and wherein the nichrome wire is configured to receive a current to generate heat and melt the trigger line.

9. The system of claim 1, wherein the launch platform is angled to provide a parabolic path for the deployed parachute.

10. A method comprising:
receiving an indication that a balloon should deploy a parachute, wherein the balloon comprises a parachute deployment system, and wherein the parachute deployment system comprises: (a) a deployment spring arranged on the launch platform, (b) a parachute that is initially folded and arranged on an opposite side of the deployment spring from the launch platform, (c) a bridle line having a first end and a second end, wherein the first end of the bridle line is attached to the parachute, (d) a lanyard line having a first end and a second end, wherein the first end of the lanyard line is attached to the deployment spring, and wherein the second end of the lanyard line is attached to the launch platform, and (e) a trigger system; and
responsive to the received indication, deploying the parachute by operating the trigger system such that the deployment spring launches the parachute and the bridle line substantially perpendicular to the launch platform, and such that after deployment the deployment spring and the lanyard line are configured to hang from the launch platform.

11. The method of claim 10, wherein the indication that the balloon should deploy a parachute is responsive to information from one or more sensors located on the payload of the balloon.

12. The method of claim 10, wherein the indication that the balloon should deploy a parachute is responsive to information from a ground-based station.

13. The method of claim 10, wherein the second end of the bridle line is attached to the launch platform.

14. The method of claim 10, wherein the parachute is configured to operate as a drogue parachute to deploy a second parachute, and wherein the second end of the bridle line is attached to the second parachute.

15. The method of claim 14, wherein the parachute deployment system further comprises:
a container coupled to the launch platform, wherein the second parachute is stored in the container; and
a second bridle line having a first end and a second end, wherein the first end of the second bridle line is attached to the second parachute, and wherein the second end of the second bridle line is attached to the launch platform.

16. A balloon comprising:
a payload;
an envelope; and
a parachute deployment system, wherein the parachute deployment system comprises:
a deployment spring arranged on a launch platform;
a parachute that is foldable and positionable on an opposite side of the deployment spring from the launch platform;
a bridle line having a first end and a second end, wherein the first end of the bridle line is attached to the parachute;
a lanyard line having a first end and a second end, wherein the first end of the lanyard line is attached to the deployment spring, and wherein the second end of the lanyard line is attached to the launch platform; and a trigger system configured to initiate deployment of the parachute, wherein upon deployment the deployment spring is configured to launch the parachute and the bridle line substantially perpendicular to the launch platform, and wherein after deployment the deployment spring and the lanyard line are configured to hang from the launch platform.

17. The balloon of claim 16, wherein the parachute deployment system is coupled to the top of the envelope.

18. The balloon of claim 16, wherein the second end of the bridle line is attached to the launch platform.

19. The balloon of claim 16, wherein the parachute is configured to operate as a drogue parachute to deploy a second parachute, and wherein the second end of the bridle line is attached to the second parachute.

20. The balloon of claim 19, wherein the parachute deployment system further comprises:

a container coupled to the launch platform, wherein the second parachute is stored in the container; and a second bridle line having a first end and a second end, wherein the first end of the second bridle line is attached to the second parachute, and wherein the second end of the second bridle line is attached to the launch platform.

* * * * *